(12) United States Patent
Vandamme

(10) Patent No.: US 6,443,830 B1
(45) Date of Patent: Sep. 3, 2002

(54) DEVICE FOR SUPPLYING AIR TO AN AIRPLANE

(76) Inventor: Marc Vandamme, Zwijndrechtsestraat 13, B-2070 Burcht (BE)

( * ) Notice: Subject to any disclaimer, the term of this patent is extended or adjusted under 35 U.S.C. 154(b) by 0 days.

(21) Appl. No.: 09/945,656

(22) Filed: Sep. 5, 2001

(30) Foreign Application Priority Data

Sep. 5, 2000 (BE) ................................................ 000559

(51) Int. Cl.[7] .............................................. B64D 13/08
(52) U.S. Cl. ...................... 454/76; 137/355.16; 454/119
(58) Field of Search ................... 454/76, 119; 138/106, 138/107; 137/355.16

(56) References Cited

U.S. PATENT DOCUMENTS

| 3,399,545 A | * | 9/1968 | Anderson et al. ............ 138/106 |
| 3,859,481 A | | 1/1975 | Sprague |
| 4,526,090 A | * | 7/1985 | Maier ..................... 137/355.16 |
| RE32,687 E | * | 6/1988 | Shepheard |
| 5,096,230 A | * | 3/1992 | Pausch et al. ............... 285/304 |
| 5,453,048 A | * | 9/1995 | Zima et al. .................. 285/238 |
| 5,715,701 A | | 2/1998 | Kreymer |

FOREIGN PATENT DOCUMENTS

| EP | 0 134 554 | 3/1985 |
| FR | 1295130 | 7/1961 |

* cited by examiner

*Primary Examiner*—Harold Joyce
(74) *Attorney, Agent, or Firm*—Bacon & Thomas, PLLC

(57) ABSTRACT

Device for supplying air to an airplane. A device for supplying air to an airplane, which at least consists of means (3) for creating a forced air stream (4) and a pipe (5) to supply the forced air stream (4) from the above-mentioned means (3) to an airplane (2), whereby this pipe (5) consists at least of a flexible hose (15), wherein the device (1) is provided with at least one coil-up mechanism (17) for the above-mentioned hose (15) and/or for an intermediate element (18) coupled to the hose (15), whereby this coil-up mechanism (17) is mainly situated outside the air section of the air supplied through the hose (15), at least when being unwound.

19 Claims, 6 Drawing Sheets

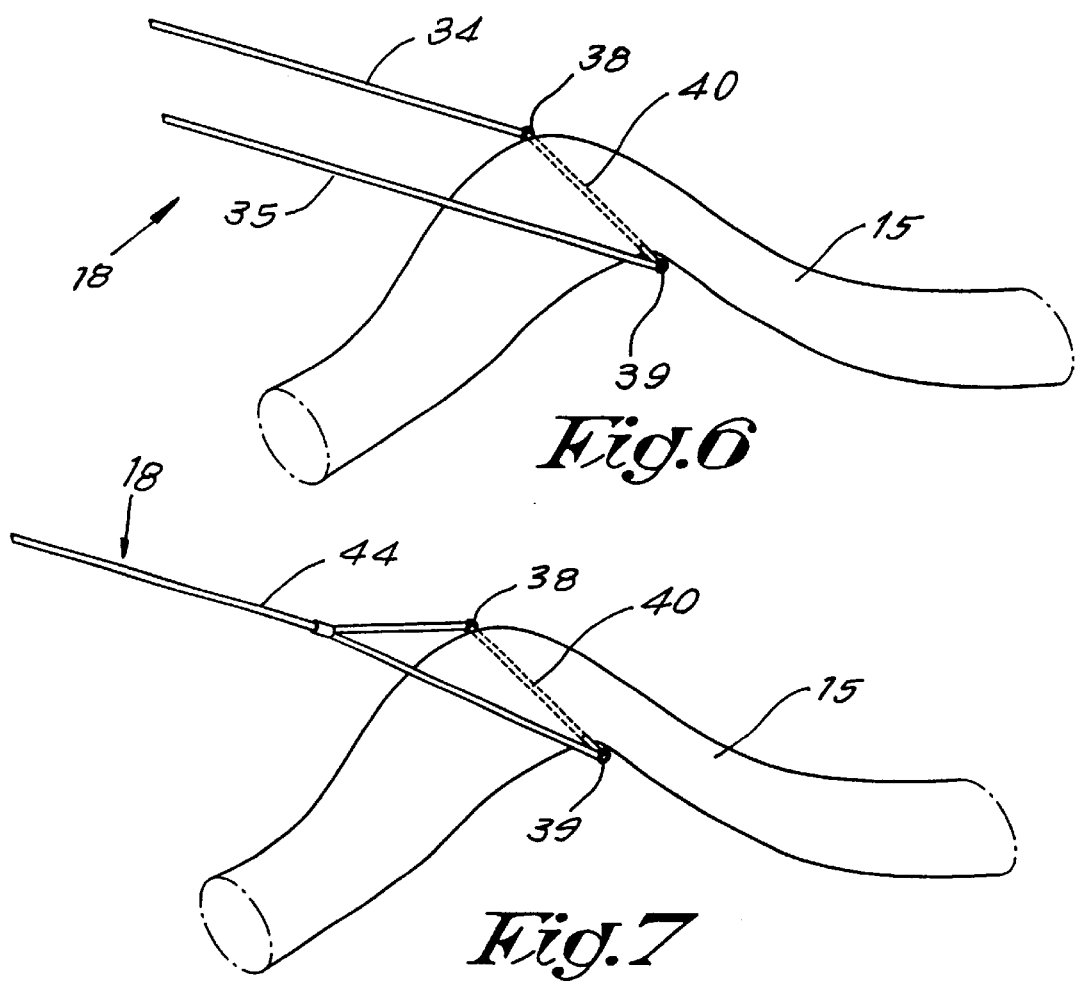
Fig.6
Fig.7
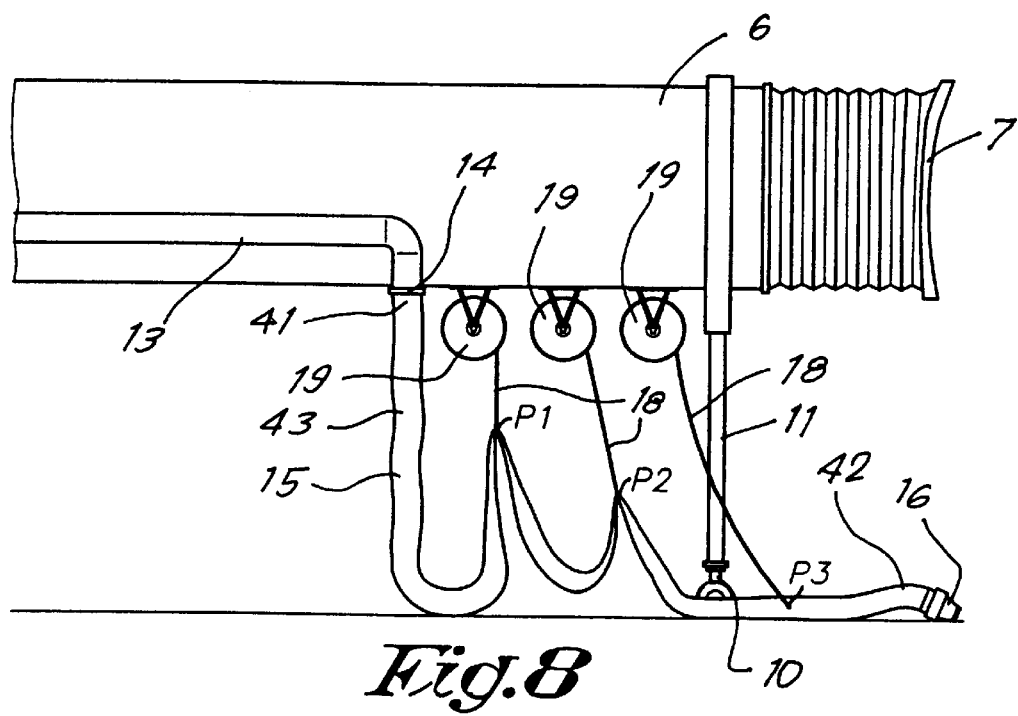
Fig.8

DEVICE FOR SUPPLYING AIR TO AN AIRPLANE

BACKGROUND OF THE INVENTION

1. Field of the Invention

The present invention concerns a device for supplying air to an airplane.

2. Discussion of the Related Art

It is known that in airplanes, after a flight, fresh and climatized air can be blown in, in order to refresh the air in the inner space and to keep the temperature under control. This air is supplied via a hose with a relatively large diameter, which is connected to an intake provided in the body of the airplane by means of a connector.

The fresh air is provided in the hose by means of a device for creating a forced air stream, such as a fan, an air pump or such, which is either or not combined with a cooling and/or heating installation.

The above-mentioned device is hereby usually attached to an access bridge, which as is known is connected to a building at one end and to the body of an airplane with its free end, and which can be placed at the entrance door. From the above-mentioned device, the air can be blown directly in the plane via the above-mentioned hose. Sometimes, a duct is required to transport the air to the side of the airplane where the access bridge is situated. Onto this duct is connected the hose, which hangs down to the ground floor when in use, and which thus can be connected to the plane by the maintenance staff.

In order to prevent the hose, before or after its use, to hinder the airplanes on the one hand and the movement of the access bridge on the other hand, it is known to store said hose when it is not in use.

According to a first known technique for putting away the hose, use is made of a little trailer fixed to the rolling chassis of the access bridge, which contains a container in which the hose can be thrown. A major disadvantage of this system consists in that, when the access bridge is lowered, for example when it must be used for a smaller airplane, i.e. with a lower entrance door, the part of the hose hanging down can end up beside the container, so that, when no attention is paid to it, the hose can end up under the wheels of the access bridge or the trailer, with all the ensuing harmful consequences. Another disadvantage of this technique consists in that the hose is stored in an irregular manner, which may have for a result that it needs to be disentangled.

According to a second known technique for putting away the hose, use is made of a coil-up mechanism consisting of a reel, whereby the hose is connected to the air supply via the winding core of the reel. A disadvantage of this second technique consists in that the air section represents a number of sharp bends to bring the supplied air in the winding core on the one hand, and to bring said air from the winding core into the hose on the other hand, so that large pressure losses are created, which has a bad influence on the good working of the whole.

SUMMARY OF THE INVENTION

The present invention aims a device for supplying air to an airplane which excludes the above-mentioned disadvantages.

To this aim, it concerns a device for supplying air to an airplane which at least consists of means for creating a forced air stream and a pipe to supply the forced air stream from the above-mentioned means to an airplane, whereby this pipe contains at least a flexible hose, wherein the device is provided with at least one coil-up mechanism for the above-mentioned hose and/or for an element coupled to the hose, whereby this coil-up mechanism is mainly situated outside the air section of the air supplied through the hose, at least when being unwound.

As use is made of a coil-up mechanism, the disadvantages of the known embodiment, which applies the first-mentioned technique, are excluded or at least minimized, as there is no free-running hose anymore.

As the coil-up mechanism is situated outside the air section, the air passage is entirely independent of the coil-up mechanism, as opposed to in the embodiment according to the above-mentioned second known technique. By 'outside the air section' is mainly understood 'beside the air section and/or beside the hose', or in other words, that the air section no longer extends through the coil-up mechanism, the reel respectively, but extends next to it, either or not at a large distance thereof.

Preferably, the hose is coupled to the coil-up mechanism at a distance from its initial end, and/or it can be coupled to the coil-up mechanism at a distance from its initial end, such that the hose is so to say doubled when being rolled up, but can be entirely released from the coil-up mechanism itself when being unwound.

The hose can hereby be coupled to the coil-up mechanism in different places, but this place is preferably situated between the initial end and the output end of the hose.

In a practical embodiment, the hose is coupled to the coil-up mechanism in the middle or almost in the middle between the initial end and the output end. Thus, when being rolled up, the hose is picked up practically in the middle, such that the rolling up over a certain distance results in a double distance of rolled-up hose.

According to a practical embodiment, the device is mounted on an access bridge for airplanes carried by a chassis, whereby this access bridge can be moved between a lowest position and a highest position, and the hose is connected to the coil-up mechanism in such a place that, when it is rolled up, the hose suspends freely above the ground floor for any position whatsoever in which the access bridge can be placed. This excludes that, when being rolled up, a part of the hose would touch the ground floor, which could disturb the good working order of the access bridge. In particular this excludes that the hose can end up under the wheels of the chassis of the access bridge.

According to the most preferred embodiment, the hose is connected to the coil-up mechanism by means of at least one flexible intermediate element, such as a cable, or said hose can be connected to the coil-up mechanism by means of said intermediate element. Thus, the hose can be freely unwound over its entire length, without having to be directly connected to the coil-up mechanism. Also, the hose can be easily rolled up by means of the intermediate element, even when the coil-up mechanism is not within hand reach as of the ground floor.

The coil-up mechanism preferably consists of a reel upon which the hose and/or the flexible auxiliary element can be rolled, whereby this reel is preferably provided with a motorized drive.

According to a variant, the coil-up mechanism consists of at least one winding element which makes it possible to wind up the intermediate element, such that the hose, in the wound-up condition, hangs above the ground floor in the shape of at least one suspended loop. The hose itself does not need to be wound up.

Other characteristics will appear from the accompanying claims.

BRIEF DESCRIPTION OF THE DRAWINGS

In order to better explain the characteristics of the invention, the following preferred embodiments are described as an example only without being limitative in any way, with reference to the accompanying drawings in which:

FIG. 6 represents the part which is indicated by F6 in FIG. 1 to a larger scale;

FIG. 7 represents a variant of the part from FIG. 6;

FIGS. 8 and 9 schematically represent two more variants of the invention.

DESCRIPTION OF THE PREFERRED EMBODIMENT

Figure 1:
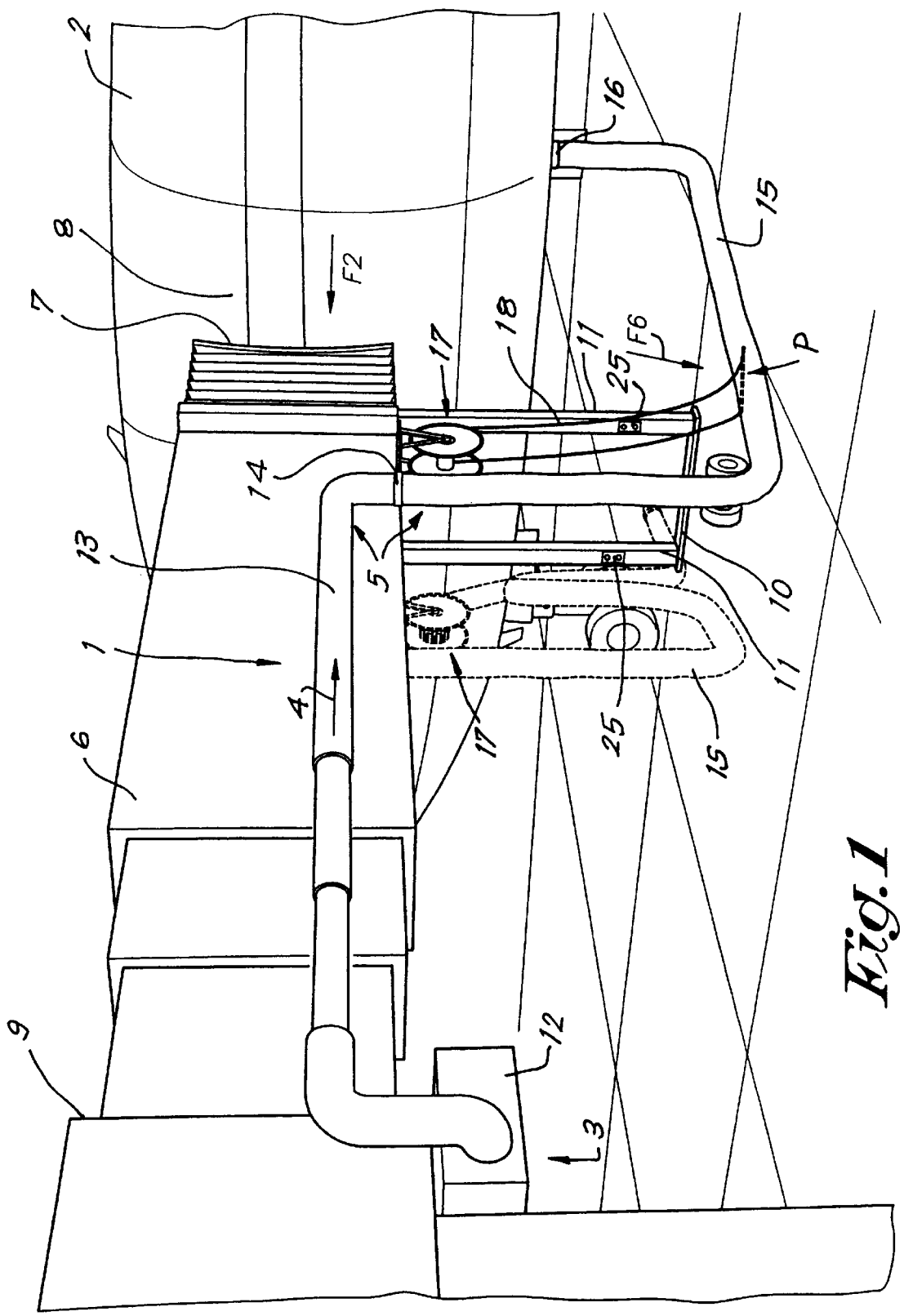
FIG. 1 represents a device according to the invention.
Figure 2:
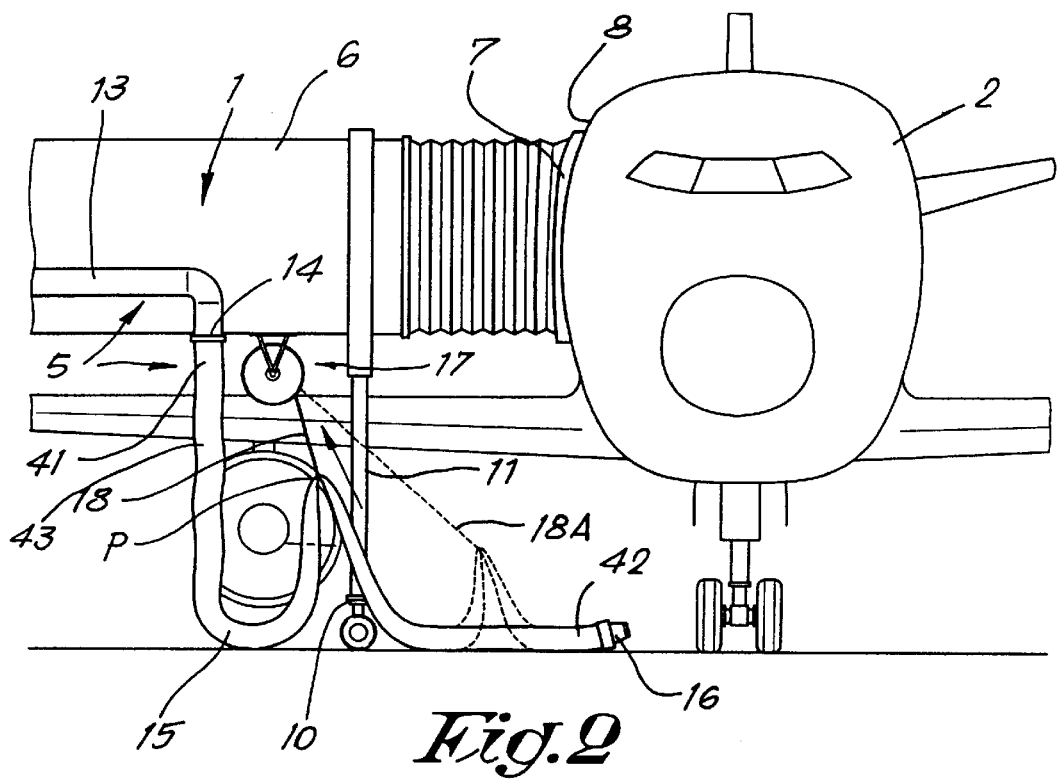
FIGS. 2 and 3 represent a view according to arrow F2 in FIG. 1, for two different positions.
Figure 3:
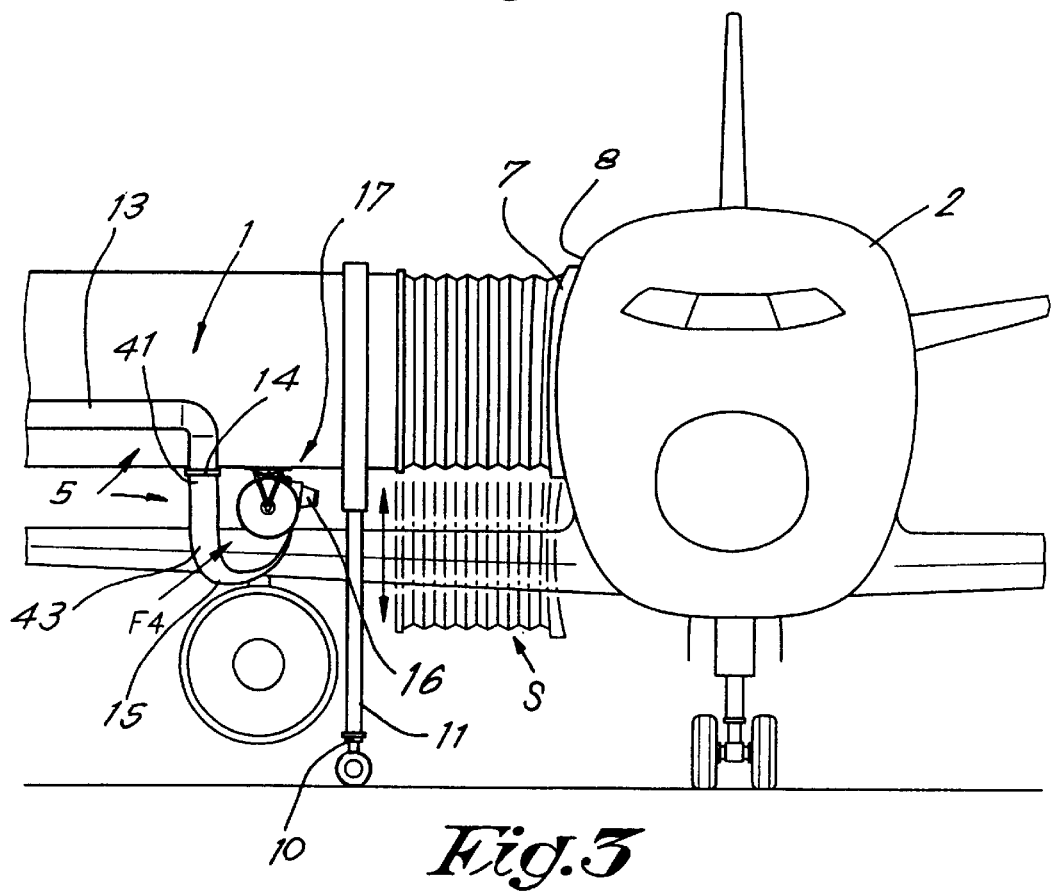

As is represented in FIGS. 1 to 3, the invention concerns a device 1 for supplying air to an airplane 2, which at least consists of means 3 for creating a forced air stream 4 and a pipe 5 to supply the forced air stream 4 to the airplane 2.

The device 1 is mounted on an access bridge 6 which, as is generally known, can be presented with its front end 7 against the body 8 of an airplane 2, where the entrance door is situated, and which is connected to a building or such with its rear end 9. Moreover, this access bridge 6, which is usually extendible, can be moved near its front end 7 as it is supported by a rolling chassis 10. Also, the front end 7 can be moved up and down along the pipes 11 so as to adjust the access bridge 6 in height as a function of the height at which the entrance door of the airplane 2 concerned is situated.

The above-mentioned means 3 consist of a device 12 such as an air pump, a fan or such, possibly combined with a cooling and/or heating device to cool or heat the air.

The pipe 5 in this case consists of a fixed pipe part 13 which extends along the side wall of the access bridge 6 on the one hand, with a front end 14 which is situated near the front end 7 of the access bridge 6, and of a hose 15 on the other hand which is connected to the end 14 and which is provided with a connector 16 at its free end with which it can be connected to the airplane 2, to an air intake especially provided to this end.

It should be noted that, in the given example, the means 3 or in other words the air group is situated at a distance from the free end of the access bridge 6, yet according to a variant it can also be situated at the front of the access bridge 6, whereby the fixed pipe part 13 is preferably omitted and the hose 15 is connected directly to the device 12. Nor is it excluded to carry out the fixed pipe part 13 as a hose in the given embodiment.

The invention is special in that the device 1 is provided with at least one coil-up mechanism 17 for the above-mentioned hose 15 and/or for an intermediate element 18 coupled to the hose 15, such as a cable, whereby this coil-up mechanism 17, as can be clearly seen in FIG. 1, is situated mainly outside the air section of the air supplied through the hose 15, at least in the unwound condition. In the given example, the coil-up mechanism 17 mainly consists of a reel 19 which, as is represented in greater detail in FIGS. 4 to 5, consists as such of a winding core 20, equipped with lateral flanges 21–22.

The coil-up mechanism 17, in particular the reel 19, is fixed to the access bridge 6, in this case mounted against the lower side of the access bridge 6 by means of a frame 23.

The reel 19 is provided with a motorized drive, consisting of a motor 24, such as a drum motor, which is built-in in the winding core 20. The motor can be controlled by means of a control panel 25 or such, which is provided for example to the chassis 10 at such a height that it is accessible to a person situated on the ground floor. Said control panel 25 preferably contains two push buttons to make the reel 19 turn in one direction and the other one respectively.

The drive is equipped with an end-of-run mechanism 26 which switches off the motor 24 during the winding up as soon as the hose 15 has been wound up and/or which prevents the motor 24 from being switched on in the winding direction when the hose 15 has already been entirely wound up. This end-of-run mechanism 26 consists of at least one rotatable arm 27 which works in conjunction with the wound-up hose 15 and which controls an end-of-run switch 28, detector or such in case of a certain deviation, which in turn makes sure that any further winding is interrupted.

Apart from that, the reel 19 is provided with a press-on roller 29 which presses the hose 15 flat while it is being wound up. In the given example, this press-on roller 29 is supported by rotatable arms situated on either side of the reel 19, namely the above-mentioned arm 27 on the one hand, and a second arm 30 on the other hand. Both arms 27 and 30 hereby form a single rotatable chassis which is hinge-mounted to the frame 23 by means of hinge points 31 and 32. As is represented, this chassis can be pressed on towards the middle with a certain force, for example by means of a spring-loaded or a gas pressure-loaded pressure cylinder 33.

The hose 15 is coupled to the coil-up mechanism 17 by means of the above-mentioned intermediate element 18 which, as is represented in FIGS. 1 and 6, in this case consists of two cables 34–35 which are fixed to the reel 19, in particular the lateral flanges 21–22, with their far ends 36–37, and to the hose 15 with their far ends 38–39.

The attachment to the hose 15 can be carried out in any way whatsoever, but according to a practical and simple embodiment, use can be made of a rod 40 to this end, as is represented in FIG. 6, which sticks through the hose 15, whereby the far ends 38–39 of the cables 34–35 are fixed to the protruding ends of this rod 40. The small diameter of the rod 40 has no influence whatsoever on the air supply through the hose 15.

The hose 15 is coupled to the coil-up mechanism 17 by means of the intermediate element 18, such at a place P on the hose 15, which is situated at a distance from the initial end 41.

Preferably, this place P is situated between the initial end 41 and the output end 42, in particular in the middle or almost in the middle between the initial end 41 and the output end 42, such that the initial end of the hose, after it has been wound up, can remain coupled to the air group or the pipe part 13.

The working of the device 1 is described hereafter on the basis of the conditions of use.

When unwound, the situation of the hose 15 is as represented in FIG. 1, whereby the hose, 15 is entirely free and the air section is not disturbed by the coil-up mechanism 17 itself. The hose 15 is hereby connected to the airplane 2 via the connector 16, after which cooled air is provided in the airplane 2 by means of the device 12 through the pipe 5.

Figure 5:
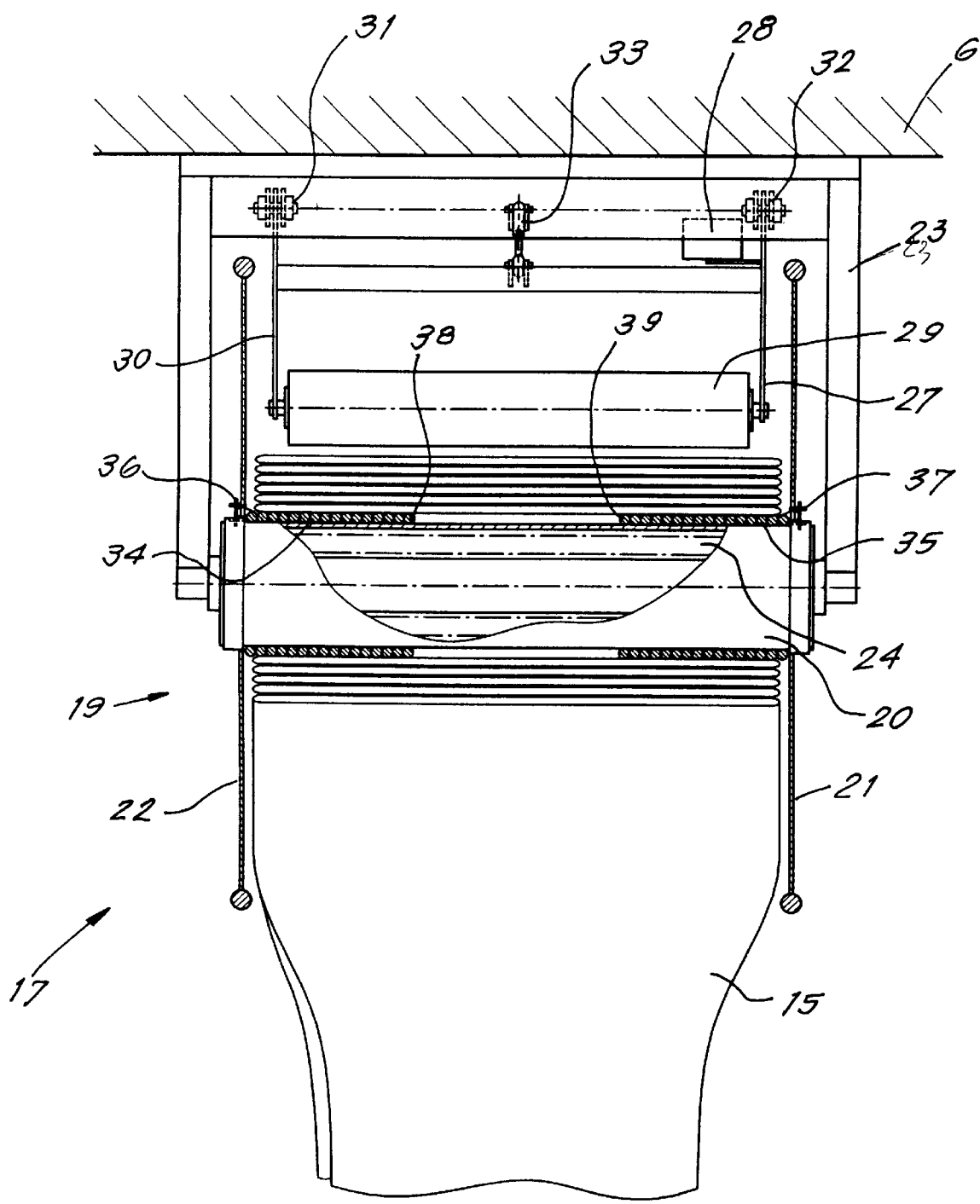
FIG. 5 represents a view according to arrow F5 in FIG. 4, whereby also a number of parts are represented as a section.

In order to store the whole, after the connector 16 has been released again, the motor 24 is activated in such a direction of rotation R1 that the reel 19 carries out a coil-up movement. The cables 34–35 are hereby wound up first on the winding core 20, for example in the form of windings situated next to one another, as represented in FIG. 5. By pulling in the cables 34–35, the hose 15 is drawn towards the reel 19, whereby it is double-folded so to say, as represented in FIG. 2.

Figure 4:
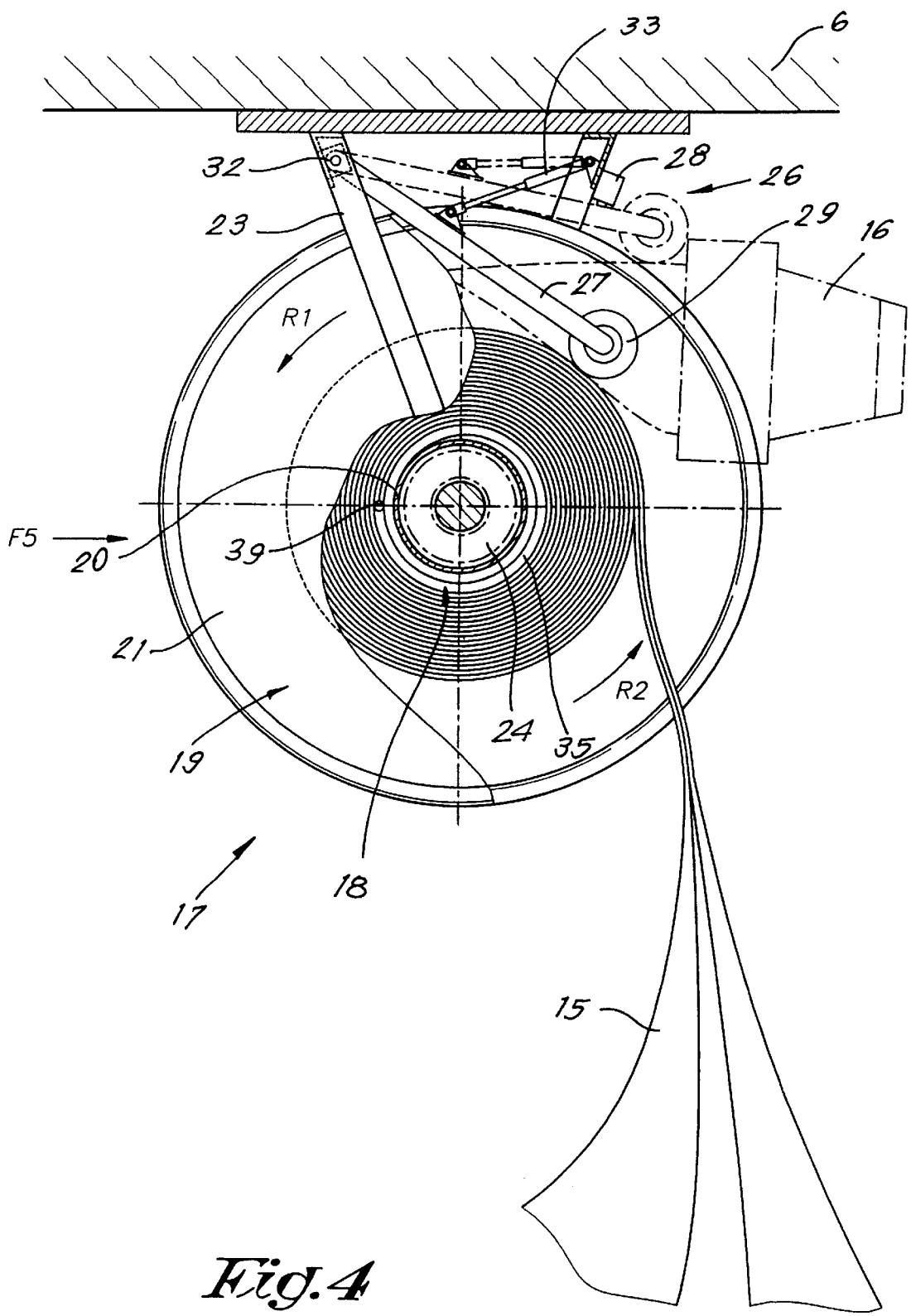
FIG. 4 represents a view of the part which is indicated by F4 in FIG. 3, to a larger scale and partially as a section.

As the winding continues, also the hose 15 is wound on the reel 19, namely double-folded, as can be seen in FIG. 4. The hose 15, which is made of a flexible material, is hereby laid flat, with the help of the press-on roller 29. As the winding continues further, the diameter of the wound-up quantity of hose 15 increases, so that the frame 23 turns. Finally, the connector 16 ends up on the reel 19, as a result of which the frame 23 is suddenly rotated upward and activates the end-of-run switch 28, so that the drive is interrupted.

A condition is reached hereby as represented in FIG. 3.

When the device 1 is used again, the motor 24 is switched on in the opposite sense of rotation R2, so that the hose 15 is unwound, until a situation as represented in FIG. 1 is reached again. It should be noted that the coil-up mechanism 17 is preferably made such that the connector 16, in the final stage, is situated in a position as represented in FIG. 4, such that when the hose 15 is unwound again, it will drop under the weight of the connector 16. Possibly, a brake can be provided, for example an internal brake, to prevent the hose 15 from freely unwinding when the device is not in use.

In the case where the coil-up mechanism 17 is fixed to the access bridge 6, the above-mentioned fixing place P is preferably selected such that the hose 15 always hangs freely above the ground floor with the remaining part 43 which has not been wound up, in any position whatsoever which the access bridge 6 can occupy. By this is meant that this part 43 can never reach the ground floor, not even when the access bridge 6 is situated in the lowest position S, as represented in FIG. 3.

It is clear that the intermediate element 18 can be of any different nature. In principle, any type of a flexible element, such as a cable, rope, belt, ribbon or such is suitable. Nor should there necessarily be made use of two cables 34 and 35. It is for example also possible, as is represented in FIG. 7, to use a single cable 44.

The coil-up mechanism 17 may, as is represented in FIG. 8, also contain several reels 19 which are coupled to the hose 15 in different places P1-P2-P3 via respective intermediate elements 18, such that a part of the hose 15 can be wound on every reel 19.

Use can also be made, according to a variant, of a second intermediate element 18A which is guided to one and the same reel 19, as represented in FIG. 2.

The coil-up mechanism 17 does not necessarily need to be mounted on the access bridge 6, although this is preferred. According to a variant, such a coil-up mechanism 17 can also be provided near the ground floor, either at the bottom of the chassis 10 or on a trailer or such coupled thereto. In this case, the hose 15 can be fixed directly to the winding core 20 or almost directly thereto at the above-mentioned place P, but without the air section going through the winding core 20 itself, so that the aimed advantage of the invention is prevailed.

Figure 9:
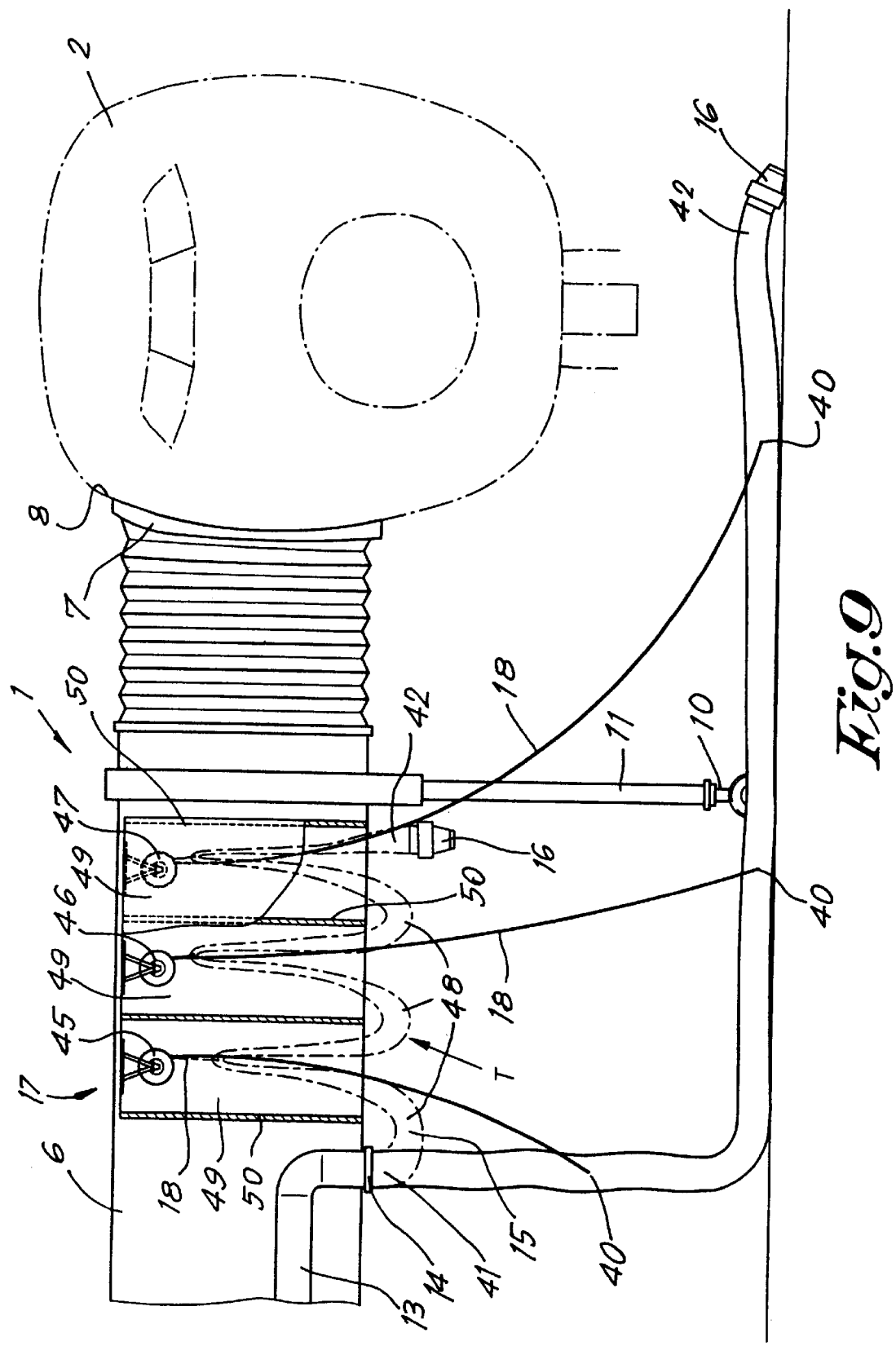

FIG. 9 represents yet another variant whereby the coil-up mechanism 17 contains three winding elements such as reels 45-46-47, whereby these winding elements make it possible to wind up the intermediate elements 18 concerned, and whereby the whole is designed such that the hose 15, in a wound-up condition T, hangs above the ground floor in the shape of loops 48. Thus, the hose 15 is not wound up itself. The reels can be driven at speeds which either or not differ from one another, for example as a function of the length of cable and/or hose to be wound up on every reel.

In order to make sure that the loops 48 are not subject to the wind, and in order to prevent them from being blown sideways and getting caught into other objects, the device 1 is preferably also provided with receptacles 49 in this case, for example in the shape of partitions So and a front wall 51, in which the hose 15 is partially collected.

Depending on the length of the hose 15 and the place where the coil-up mechanism 17 can be mounted, also less or more than three reels 45-46-47 can be used, and thus in principle also merely one reel.

It is clear that the invention not only concerns the device 1 as a whole, but also the coil-up mechanism 17 as such, as such a coil-up mechanism 17 can be provided to existing devices in the place of the known techniques.

It is also clear that several devices 1 can be provided on an access bridge 6, as represented by means of the dashed line in FIG. 1, whereby the respective hoses 15 can be fed with air, either or not via a common device 12.

According to a variant which is not represented, use can also be made of a reel which makes it possible for the hose 15 to be first provided on the winding core with its initial end 42, and to subsequently wind up said hose 15 as of this initial end 42. The connector 16 can hereby be possibly taken up in a seating in the winding core, or it can be stuck sideways through one of the lateral flanges of the reel, through an opening which is especially provided to this end, such that the connector 16 does not obstruct the winding.

The hose 15 as such may consist of different parts, including for example extension pieces, whereby not necessarily all parts must be able to coil up according to the invention.

Finally, the invention also concerns the method used hereby, wherein the hose and/or the intermediate element is coiled up when being stored, but whereby an air section can be provided for in the condition of use, whereby this air section is independent of, in other words is not influenced by, the used coil-up mechanism.

The invention is by no means limited to the above-described embodiments represented in the accompanying drawings; on the contrary, such a device and method can be realized according to different variants while still remaining within the scope of the invention.

Thus, for example, the above-described end-of-run mechanism can be replaced by any other end-of-run system whatsoever. According to a preferred variant, a detectable element is provided on the hose, preferably on its free end, whereas a detector is provided on the coil-up mechanism which will notice the detectable element as soon as it comes within range of the reel, so that it can stop the winding. The detectable element can be of any nature whatsoever, but preferably an optically detectable element is provided for, for example a reflective strip, such that when light is shone on it and when the reflected light is observed, an intervention is possible.

What is claimed is:

1. A device for supplying air to an airplane, which at least consists of means for creating a forced air stream and a pipe to supply the forced air stream from the aboved mentioned means for creating a forced air stream to an airplane, whereby this pipe consists at least of a flexible hose, wherein the device is provided with at least one coil-up mechanism for the above-mentioned hose and/or for an intermediate element coupled to the hose, whereby this coil-up mechanism is mainly situated outside the air section of the air supplied through the hose, at least when being unwound.

2. The device according to claim 1, wherein the hose is provided with an initial end via which the air can be supplied in the hose and with an output end which is designed to be connected to the airplane; and in that the hose is coupled to the coil-up mechanism and/or can be coupled to the coil-up mechanism in at least one place, whereby this place is situated at a distance from the initial end.

3. The device according to claim 2, wherein the above-mentioned place where the hose can be coupled to the coil-up mechanism is situated between the initial end and the output end.

4. The device according to claim 3, which further contains one coil-up mechanism and in that the above-mentioned place where the hose can be coupled to the coil-up mechanism is situated in the middle or almost in the middle between the initial end and the output end.

5. The device according to claim 3, which is mounted on an access bridge carried by a chassis, whereby this access bridge can be moved between a lowest position and a highest position; and in that the hose is connected to the coil-up mechanism at such a place that, when it is rolled up, the part of the hose which is situated between the initial end and the coil-up mechanism hangs freely above the ground floor for any position whatsoever in which the access bridge can be placed.

6. The device according to claim 1, wherein the hose is connected to the coil-up mechanism by means of at least one flexible intermediate element.

7. The device according to claim 6, wherein the flexible intermediate element as such consists of one or several cables which extend between the coil-up mechanism and the hose.

8. The device according to claim 1, wherein the coil-up mechanism consists of at least one reel.

9. The device according to any of claims 6, wherein the coil-up mechanism contains at least one reel which makes it possible to first wind the intermediate element on it and subsequently at least a part of the hose in double-folded condition.

10. The device according to claim 8, wherein every reel concerned is provided with a motorized drive.

11. The device according to claim 10, wherein the drive contains a motor which is built-in in the winding core of the reel, whereby the device is possibly also provided with a brake.

12. The device according to claim 10, wherein the drive is equipped with an end-of-run mechanism which switches off the motor during the winding up and/or which prevents the motor from being switched on in the winding direction when the hose has already been entirely wound up.

13. The device according to claim 12, wherein the end-of-run mechanism consists of at least one rotatable arm which works in conjunction with the wound-up hose and which controls an end-of-run switch, detector or such in case of a certain deviation.

14. The device according to claim 12, wherein the end-of-run mechanism mainly consists of a detectable element provided on the hose on the one hand, preferably on its free end, and of a detector provided on the coil-up mechanism on the other hand, which will notice the detectable element as soon as it comes within range of the coil-up mechanism, the reel concerned respectively, so as to stop the winding.

15. The device according to claim 14, wherein the detectable element consists of an optically detectable element, for example a reflective strip, such that when light is shone on it and when the reflected light is observed, an intervention will take place.

16. The device according to claim 8, wherein the reel is provided with a press-on roller which presses the hose to be wound flat.

17. The device according to claim 1, wherein the coil-up mechanism is mounted on or against an access bridge for passengers.

18. The device according to claim 1, wherein the coil-up mechanism consists of at least one winding element which makes it possible to wind up the intermediate element, such that the hose, when being wound up, hangs above the ground floor in the shape of at least one suspended loop.

19. The device according to claim 1, which further contains two or more coil-up mechanisms which make it possible to wind up different parts of the hose and/or different intermediate elements coupled thereto respectively.

* * * * *